(12) United States Patent
Yamamoto (10) Patent No.: US 7,962,028 B2
(45) Date of Patent: Jun. 14, 2011

(54) LENS APPARATUS AND CAMERA SYSTEM

(75) Inventor: Osamu Yamamoto, Shimotsuke (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/716,394

(22) Filed: Mar. 3, 2010

(65) Prior Publication Data
US 2010/0226634 A1    Sep. 9, 2010

(30) Foreign Application Priority Data
Mar. 3, 2009   (JP) ................................. 2009-048702

(51) Int. Cl.
*G03B 17/00* (2006.01)
*G03B 13/00* (2006.01)
(52) U.S. Cl. ........... 396/80; 359/698; 396/530; 348/350
(58) Field of Classification Search .................... 396/80, 396/529–533; 359/698
See application file for complete search history.

(56) References Cited

U.S. PATENT DOCUMENTS

| | | | | |
|---|---|---|---|---|
| 3,940,777 A | * | 2/1976 | Komine | ........................ 396/85 |
| 4,333,716 A | | 6/1982 | Sakane et al. | |
| 2003/0173494 A1 | * | 9/2003 | Nakamura | ................. 250/201.2 |
| 2008/0043351 A1 | * | 2/2008 | Hirakawa | ..................... 359/823 |
| 2010/0110236 A1 | * | 5/2010 | Kurokawa et al. | ............ 348/241 |

FOREIGN PATENT DOCUMENTS

JP          55-076312 A     6/1980

* cited by examiner

*Primary Examiner* — W. B. Perkey
*Assistant Examiner* — Dennis Hancock
(74) *Attorney, Agent, or Firm* — Rossi, Kimms & McDowell LLP (57) ABSTRACT

A lens apparatus comprises a barrel 100 which houses an imaging optical system including magnification-varying lens units 26 and 27, a focus lens unit 25, and a beam separation element 29 which separates a part of a light beam from an object out of a light beam directed to an imaging surface, operating members 1, 2, and 3 disposed on an outer circumference of the barrel and configured to be manually operated, a drive unit 200 disposed outside the barrel and including actuators 45 and 50 which drives each of the magnification-varying lens unit and the focus lens unit, and a controller 60 which controls the actuator, and a focus detector 31 disposed outside the barrel and configured to detect a focus state of the imaging optical system using the light beam separated by the beam separation element. The focus detector is embedded in the drive unit.

6 Claims, 4 Drawing Sheets

LENS APPARATUS AND CAMERA SYSTEM

BACKGROUND OF THE INVENTION

1. Field of the Invention

The present invention relates to a lens apparatus in which a drive unit driving a magnification-varying lens unit is disposed outside a barrel that houses the magnification-varying lens unit and a focus lens unit.

2. Description of the Related Art

Some lens apparatuses separate a part of a light beam from an object directed to an imaging surface by a reflecting element such as a half mirror or a total reflecting mirror to guide it to a focus detection sensor and detects a focus state of an imaging optical system based on a phase difference obtained by the focus detection sensor (Japanese Patent Laid-open No. 55-76312).

A lens apparatus disclosed in Japanese Patent Laid-open No. 55-76312 includes a focus detection optical system which guides a light beam reflected by a reflecting element to the focus detection sensor different from the imaging optical system. The focus detection optical system and the focus detection sensor are disposed so as to protrude to an outside of a barrel which houses the imaging optical system.

However, the lens apparatus disclosed in Japanese Patent Laid-open No. 55-76312 has a problem as described below.

In a portable lens apparatus for a television broadcast, a user mostly uses a manual focus and an auto focus (AF) concomitantly. The manual focus is performed by rotating an operation ring which is rotatably provided at an outer circumference of a barrel. Similarly, the operations of varying a magnification or an iris (an aperture) are mostly performed by the operation of the operation ring.

However, when the focus detection optical system and the focus detection sensor are protruded outside the barrel, a hand which operates each operation ring may be interfered with by the protruded portion. In this case, the operability of each operation ring is deteriorated, and an accurate and quick operation cannot be performed.

When foreign substances such as dirt are adhered to the focus detection sensor, an output from the sensor, i.e. a focus detection result, may have an error. Therefore, an enclosure needs to be provided around the sensor for preventing the dirt. However, since the sensor is disposed at an end portion of the focus detection optical system, the protruded portion is enlarged if such an enclosure is provided. Thus, the operability of the manual operation is deteriorated.

SUMMARY OF THE INVENTION

The present invention provides a lens apparatus provided with a focus detector outside a barrel and also capable of preventing deterioration of manual operability, and a camera system including the lens apparatus.

A lens apparatus as one aspect of the present invention comprises a barrel which houses an imaging optical system including a magnification-varying lens unit, a focus lens unit, and a beam separation element which separates apart of a light beam from an object out of a light beam directed to an imaging surface, an operating member disposed on an outer circumference of the barrel and configured to be manually operated, a drive unit disposed outside the barrel and including an actuator which drives each of the magnification-varying lens unit and the focus lens unit, and a controller which controls the actuator, and a focus detector disposed outside the barrel and configured to detect a focus state of the imaging optical system using the light beam separated by the beam separation element. The focus detector is embedded in the drive unit.

A lens apparatus as another aspect of the present invention comprises a barrel which houses an imaging optical system including a magnification-varying lens unit, a focus lens unit, and a beam separation element which separates apart of a light beam from an object out of a light beam directed to an imaging surface, an operating member disposed on an outer circumference of the barrel and configured to be manually operated, a drive unit disposed outside the barrel and including an actuator which drives each of the magnification-varying lens unit and the focus lens unit, and a controller which controls the actuator, and a focus detector disposed outside the barrel and configured to detect a focus state of the imaging optical system using the light beam separated by the beam separation element. The focus detector is housed in a housing different from that of the drive unit which is disposed along an outer surface of the drive unit.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Embodiment 1

Figure 1:
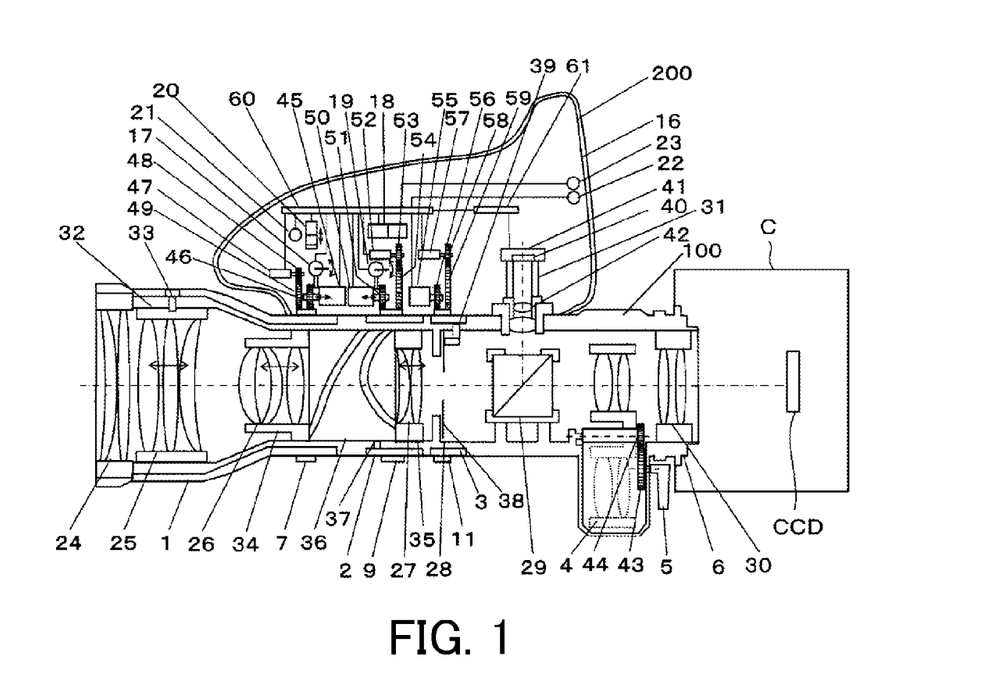
FIG. 1 is a schematic diagram showing an internal structure of a lens apparatus that is Embodiment 1 of the present invention.
Figure 2:
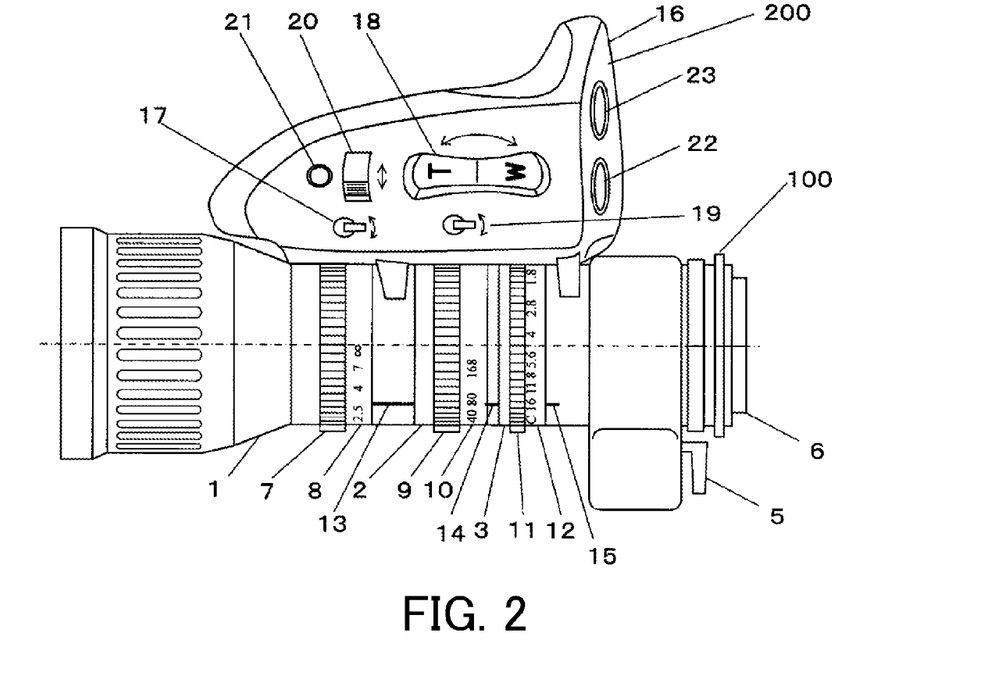
FIG. 2 is a plan diagram showing an outer appearance of a lens apparatus of Embodiment 1.

FIG. 1 shows a configuration of a lens apparatus that is Embodiment 1 of the present invention. FIG. 2 is an outer appearance of the lens apparatus.

As shown in FIG. 1, a drive unit 200 which has a function as a grip used when a user holds the lens apparatus is attached to an outside of a barrel 100 of the lens apparatus. A focus operation ring 1, a zoom operation ring 2, and an iris operation ring 3 as operating members are rotatably disposed from a front portion (a portion at an object side) to an intermediate portion on an outer circumferential surface of the barrel 100.

A lever 5 for inserting an extender lens 4 into an optical path and for removing the extender lens 4 from the optical path in the lens apparatus, and a mount 6 for detachably mounting the lens apparatus on a camera C are provided at a rear portion of the barrel 100. A combination of the lens apparatus and the camera C constitutes a camera system.

A gear 7 and a focus scale 8 (see FIG. 2) are provided on an outer circumferential surface of the focus operation ring 1. A gear 9 and a zoom scale (see FIG. 2) are provided on an outer circumferential surface of the zoom operation ring 2. Further, a gear 11 and an iris scale 12 (see FIG. 2) are provided on an outer circumferential surface of the iris operation ring 3.

Index lines 13, 14, and 15 that are indexes of the operations of the focus operation ring 1, the zoom operation ring 2, and the iris operation ring 3 are provided on the outer circumferential surface of the barrel 100.

As described above, a housing 16 of the drive unit 200 has a grip shape for the user to hold the lens apparatus.

A switch lever 17 for switching an AF in which a rear focus lens unit 25 described below is driven by a motor and a manual focus in which it is driven by the focus operation ring 1 manually operated is provided on an upper surface (an outer surface) of the housing 16. Further, a switch lever 19 for switching a power zoom in which magnification-varying lens units 26 and 27 described below are driven by motors and a manual zoom in which they are driven by the zoom operation ring 2 manually operated is provided on the upper surface of the housing 16. A seesaw switch 18 for instructing a zoom direction and a zoom speed in the power zoom is provided on the upper surface of the housing 16.

A switch 20 for switching an automatic control (an auto iris) and a manual operation (a manual iris) of an iris 28 described below is provided on the upper surface of the housing 16. Further, an exposure switch 21 for temporarily performing an automatic exposure operation when the switch 20 is set to a manual side is provided on the upper surface of the housing 16.

A VTR switch 22 which instructs start and stop of recording an image and an AF switch 23 which instructs start and stop of an AF operation are provided on a rear surface (an outer surface) of the housing 16.

When the user performs a shooting while carrying the lens apparatus over his shoulder, he grips the drive unit 200 by the right hand to hold the whole lens apparatus. When the user performs the manual focusing, he moves the switch lever 17 to the manual focus side and rotates the focus operation ring 1 by the left hand. The user performs the AF by moving the switch lever 17 to the AF side and pressing the AF switch 23.

When the user performs the manual zooming, he tilts the switch lever 19 to the manual zoom side and rotates the zoom operation ring 2 by the left hand. The user performs the power zooming by tilting the switch lever 19 to the power zoom side and operates the seesaw switch 18 by the right hand.

When the user performs the manual iris, he moves the switch 20 to the manual iris side and rotates the iris operation ring 3 by the left hand. The auto iris is performed by moving the switch 20 to the auto side, and an opening diameter of the iris 28 is controlled in accordance with exposure information obtained from the camera C Next, an internal configuration of the lens apparatus will be described with reference to FIG. 1. A front focus lens unit 24, a rear focus lens unit 25, a front magnification-varying lens unit 26, a rear magnification-varying lens unit 27, an iris 28, a separation prism 29, and a rear relay lens unit 30 are arranged in order from a front side inside the barrel 100. An extender lens unit 4 is disposed so as to be insertable and removable between the separation prism 29 and the rear relay lens unit 30. The front focus lens unit 24 through the rear relay lens unit 30 (and the inserted extender lens unit 4) constitute an imaging optical system. The separation prism 29 corresponds to a beam separation element.

The separation prism 29 separates apart of a light beam entering the imaging optical system from an object out of a light beam for an imaging surface in the camera C. Specifically, the separation prism 29 has a translucent semireflecting surface (a half mirror), and one part of the light beam from the object is reflected to be directed to an AF unit 31 as a focus detector described below and the other part of the light beam is directed to an imaging surface.

An image pickup element ("CCD" in the drawing) such as a CCD sensor or a CMOS sensor which performs a photoelectric conversion of an optical image of an object formed by a light beam from the object is disposed on the imaging surface in the camera C, and is capable of generating a shooting image (a video) using an output signal of the image pickup element.

The front focus lens unit 24 is a fixed lens unit arranged at a forefront side of the barrel 100. The rear focus lens unit 25 is held by a focus barrel 32 and moves in an optical axis direction of the imaging optical system to perform a focus adjustment. When the focus operation ring 1 rotates, the focus barrel 32 is moved in the optical axis direction via a translatory drive mechanism such as a feed screw (not shown) and a connecting pin 33.

The front magnification-varying lens unit 26 (front zoom lens unit) and the rear magnification-varying lens unit 27 (rear zoom lens unit) are held by a front zoom barrel and a rear zoom barrel 35 respectively, and vary a magnification by changing their positions and an interval between them. A cam ring 36 is disposed between the barrel 100, and the front zoom barrel 34 and the rear zoom barrel 35. When the cam ring 36 rotates via a connecting pin 37 in accordance with the rotation of the zoom operation ring 2, the front zoom barrel 34 and the rear zoom barrel 35 move in the optical axis direction by engaging a cam groove formed on the cam ring 36 with a cam follower (not shown) provided on the front zoom barrel 34 and the rear zoom barrel 35.

The iris operation ring 3 and the iris 28 are connected via the connecting pin 39. When the iris operation ring 3 rotates, a plurality of aperture blades 38 of the iris 28 rotationally move to change its opening diameter. Thus, an amount of light reaching the imaging surface through the imaging pickup system is adjusted.

When the lever 5 is rotationally moved, the extender lens unit 4 is rotationally moved by transmitting its moving force via the gears 43 and 44 to be inserted and removed with respect to an optical path of the imaging optical system.

A focus motor 45, a zoom motor 50, and an iris motor 55 as actuators for electrically driving the focus operation ring 1, the zoom operation ring 2, and the iris operation ring 3, respectively, are housed in the housing 16 of the drive unit 200. Further, a main controller 60 which controls each motor and an AF controller 61 which calculates an in-focus position of the rear focus lens unit 25 based on a signal from an AF unit 31 (an amplifier circuit 41) described below are housed in the housing 16. Each of the main controller 60 and the AF controller 61 is formed on a board.

A gear 46 attached to an output shaft of the focus motor 45 is protruded from an opening portion (not shown) formed on the housing 16 to a side of the barrel 100. The gear 46 engages with the gear 7 of the focus operation ring 1 in a state where the switch lever 17 has been moved to the AF side. However, when the switch lever 17 is moved to the manual focus side, the engagement of the gear 46 with respect to the gear 7 is released. A rotary encoder 47 for detecting a rotational position of the focus operation ring 1 engages with the gear 7 via a gear 48 and an idle gear 49.

A gear 51 attached to an output shaft of the zoom motor 50 is protruded from an opening portion (not shown) formed on the housing 16 to a side of the barrel 100. The gear 51 engages with the gear 9 of the zoom operation ring 2 in a state where the switch lever 19 has been moved to the power zoom side. However, when the switch lever 19 is moved to the manual zoom side, the engagement of the gear 51 with respect to the gear 9 is released. A rotary encoder 52 for detecting a rotational position of the zoom operation ring 2 engages with the gear 9 via a gear 53 and an idle gear 54.

A gear 56 attached to an output shaft of the iris motor 55 is protruded from an opening portion (not shown) formed on the housing 16 to a side of the barrel 100. The gear 56 engages with the gear 11 of the iris operation ring 3 in a state where the switch 20 has been moved to the auto iris side. However, when the switch 20 is moved to the manual iris side, the engagement of the gear 56 with respect to the gear 11 is released. A rotary encoder 57 for detecting a rotational position of the iris operation ring 3 engages with the gear 11 via a gear 58 and an idle gear 59.

The main controller 60 controls the zoom motor 50 and the iris motor 55 while monitoring output values of the rotary encoders 52 and 57 in performing the manual zoom and the manual iris. The main controller 60 also controls the zoom motor 50 while monitoring the output value of the rotary encoder 52 in accordance with the operation of the seesaw switch 18. Further, the main controller 60 performs a control in accordance with the operations of a VTR switch 22, the AF switch 23, the switch 20, and the exposure switch 21.

An AF unit 31 is disposed outside the barrel 100. The AF unit 31 includes a focus detection sensor (hereinafter, referred to as an AF sensor) 40, a focus detection optical system (hereinafter, referred to as an AF optical system) 42 which guides light beams separated by the separation prism 29 to the AF sensor 40, and an amplifier circuit 41 which amplifies an output from the AF sensor 40.

In FIG. 1, although a part of the AF optical system 42 is positioned inside the outer circumferential surface of the barrel 100, most of the AF unit 31 except this is disposed (protruded) outside the barrel 100. Including such a case, in the present embodiment, it is defined that the AF unit 31 is disposed outside the barrel 100.

Further, in the present embodiment, the AF unit 31 is embedded in the drive unit 200. In other words, the AF unit 31 is disposed inside the housing 16 of the drive unit 200.

The AF sensor 40 performs a photoelectric conversion of a pair of images that the AF optical system 42 has formed by light beams from the object to generate a pair of image signals corresponding to the pair of images. The amplifier circuit 41 amplifies the pair of image signals up to a predetermined level to output it to the AF controller 61.

The AF controller 61 performs a correlation calculation of a pair of image signals to calculate a phase difference of the pair of image signals and to calculate a focus state (defocus amount) of the imaging optical system based on the phase difference. Thus, the focus state of the imaging optical system is detected by using the AF sensor 40.

The AF controller 61 calculates a driving direction and a driving amount of the rear focus lens unit 25 (the focus motor 45) which are necessary for obtaining an in-focus state based on the calculated defocus amount and position information of the magnification-varying lens units 26 and 27. The AF controller 61 performs an A/D conversion of information of the calculated driving direction and driving amount to output them to the main controller 60 as digital signals. The main controller 60 controls the focus motor 45 based on the information of the inputted driving direction and driving amount. Thus, the AF using a phase difference detection method is performed.

Because the AF controller 61 is disposed near the main controller 60 and also the digital signal for which the A/D conversion has been performed by the AF controller 61 is inputted to the main controller 60, the influence of a noise on a signal path between the AF controller 61 and the main controller 60 is reduced.

As described above, according to the present embodiment, because the AF unit 31 is embedded in the drive unit 200, the possibility of deterioration of the operability of the manual focusing or the manual zooming can be reduced.

Embodiment 2

Figure 3:
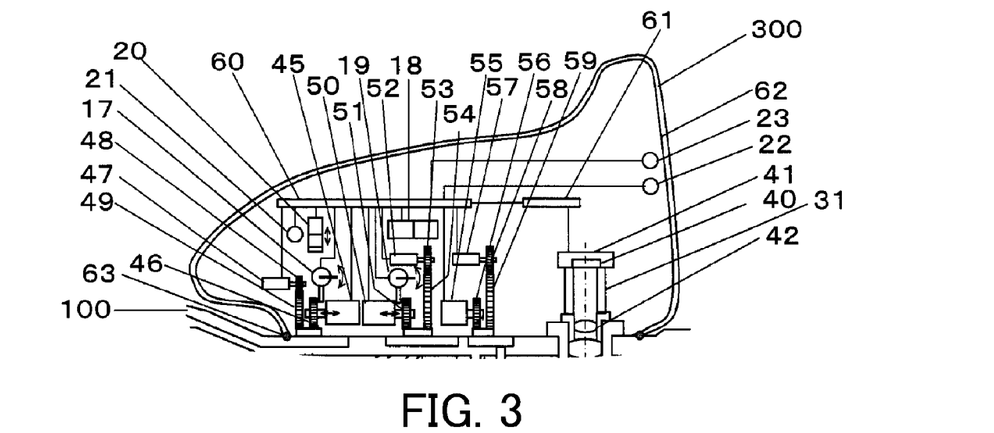
FIG. 3 is a schematic diagram showing an internal structure of a drive unit included in a lens apparatus that is Embodiment 2 of the present invention.

FIG. 3 shows an internal structure of a drive unit included in a lens apparatus that is Embodiment 2 of the present invention. In FIG. 3, elements common to those shown in FIG. 1 are denoted by the same reference codes as those of FIG. 1 and description thereof will be omitted.

In the present embodiment, a dustproof member 63 is disposed between a housing 62 of a drive unit 300 and a barrel 100. Specifically, as shown in enlarged FIG. 4, a concave portion is formed at an end portion at a side of the barrel 100 of the housing 62, and the dustproof member 63 is pressed into the dustproof member 63.

Figure 4:
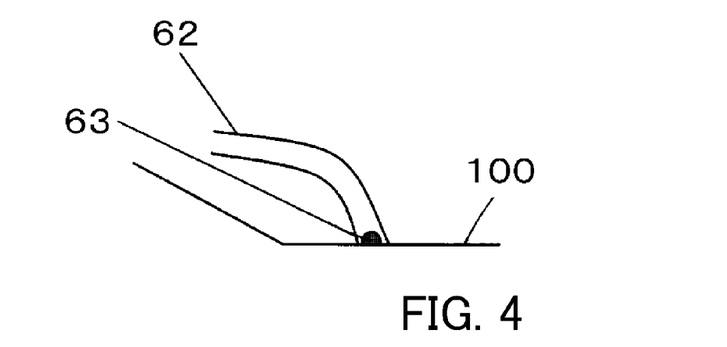
FIG. 4 is an enlarged diagram of a part of FIG. 3.

The dustproof member 63 is formed by a rubber material such as NBR or EVC. The dustproof member 63 is disposed around all circumferences of the end portion of the housing 62 and is elastically deformed between the housing 62 and the barrel 100 to spatially shield the inside and the outside of the housing 62.

The dustproof member 63 is capable of improving the effect of preventing the intrusion of foreign substances such as dirt or dust into the housing 62 as compared with the case of Embodiment 1, and an error operation of an AF caused by the adherence of the foreign substances to the AF unit 31 (especially, the AF sensor 40) disposed inside the housing 62 can be prevented.

Embodiment 3

Figure 5:
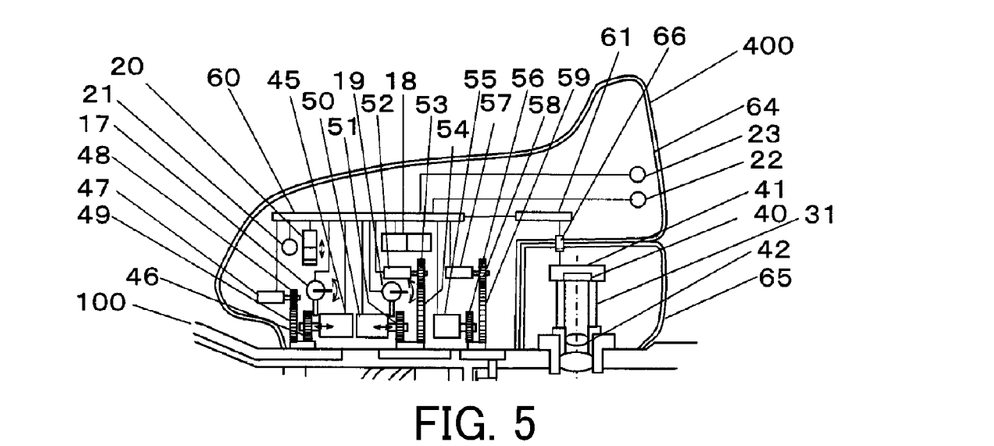
FIG. 5 is a schematic diagram showing an internal structure of a drive unit included in a lens apparatus that is Embodiment 3 of the present invention.

FIG. 5 shows an internal structure of a drive unit included in a lens apparatus that is Embodiment 3 of the present invention. In FIG. 5, elements common to those shown in FIG. 1 are denoted by the same reference numerals as those of FIG. 1 and description thereof will be omitted.

In the drive unit 200 of Embodiment 1, the AF unit 31 is housed in the housing 16 which houses the motors 45, 50, and 55, the main controller 60, the AF controller 61, and the like.

On the other hand, in the present embodiment, a housing (hereinafter, referred to as a second housing) 65 different from a housing (hereinafter, referred to as a first housing) 64 of a drive unit 400 is prepared, and the AF unit 31 is housed in the second housing 65. The first housing 64 houses the motors 45, 50, and 55, the main controller 60, the AF controller 61, and the like.

The second housing 65 has a shape along an outer surface of the first housing 64. For example, FIG. 5 shows a case where the second housing 65 has a shape housed between a concave portion formed at a rear portion of the first housing 64 and an outer circumferential surface of the barrel 100. Thus, in the present embodiment, the second housing 65 is disposed along the outer surface of the first housing 64.

The alternative view is that the housing of the drive unit 400 is divided into the first housing 64 and the second housing 65. In this case, although the housing is divided, the motors 45, 50, and 55, the main controller 60, the AF controller 61, and the like, and the AF unit 31 are embedded in the drive unit 400.

At least one of the first housing (the housing of the drive unit) 64 and the second housing (the housing of the AF unit 31) 65 is provided with an electric connector 66 for inputting an image signal from the amplifier circuit 41 of the AF unit 31 to the AF controller 61.

An end portion of the second housing 65 contacts the barrel 100 so that there is not gap between all the circumferences and the outer circumferential surface of the barrel 100, and the inside and the outside of the second housing 65 are spatially shielded. Accordingly, as compared with Embodiment 1, the effect of preventing the intrusion of foreign substances into the second housing 65 (the adherence of foreign substances to the AF sensor 40) can be improved. Similarly to the case of Embodiment 2, a dustproof member may be disposed between the end portion of the second housing 65 and the outer circumferential surface of the barrel 100.

According to the present embodiment, the second housing 65 is disposed along the outer surface of the first housing 64 to integrate the AF unit 31 (the second housing 65) with the drive unit 400. Therefore, similarly to the case of Embodiment 1 where the AF unit 31 is embedded in the drive unit 200, the possibility of deterioration of the operability of the manual focusing or the manual zooming caused by proving the AF unit 31 can be reduced.

Each of the first housing 64 (and the motors 45, 50, and 55, the controllers 60 and 61, or the like) and the second housing 65 (and the AF unit 31) is independently detachable from the barrel 100 by forming the housings separately like the present embodiment. Accordingly, at the time of assembling the lens apparatus, a positioning accuracy of the AF unit 31 with respect to the barrel 100 can be easily improved. Further, the maintenance workability for each housing can be improved.

Embodiment 4

Figure 6:
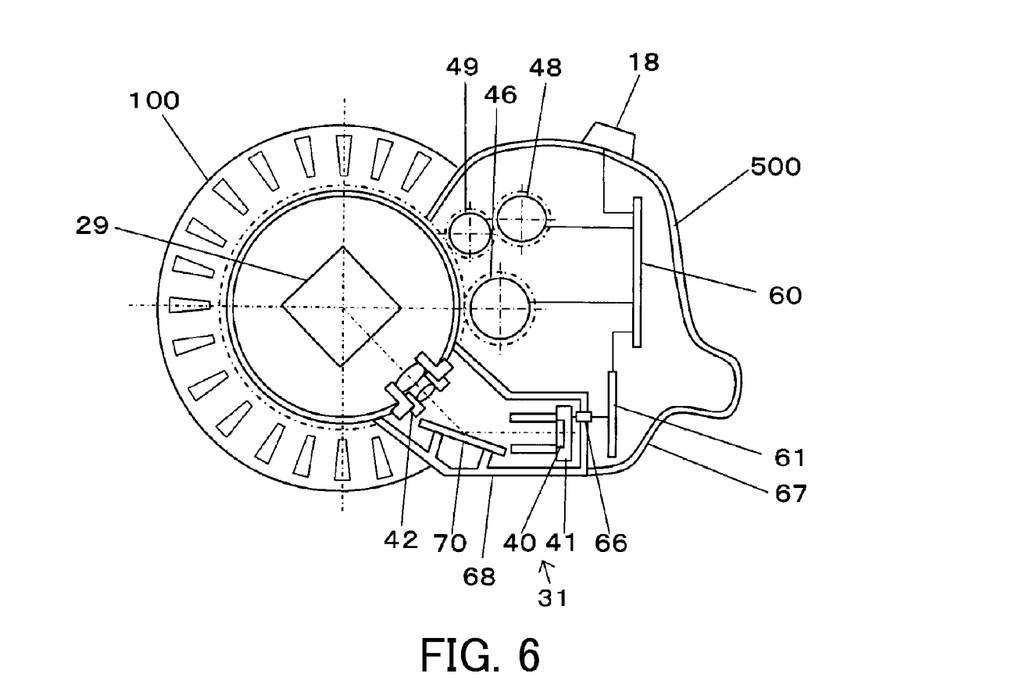
FIG. 6 is a cross-sectional diagram showing an internal structure of a lens apparatus that is Embodiment 4 of the present invention.

FIG. 6 shows a cross section which is orthogonal to an optical axis direction of a lens apparatus that is Embodiment 4 of the present invention. In FIG. 6, elements common to those shown in FIG. 1 are denoted by the same reference numerals of FIG. 1 and description thereof will be omitted.

In the drive unit 200 of Embodiment 1, the AF unit 31 is housed in the housing 16 which houses the motors 45, 50, and 55, the main controller 60, the AF controller 61, and the like.

On the other hand, in the present embodiment, a housing of a drive unit 500 is divided into a first housing 67 which houses the motors 45, 50, and 55, the main controller 60, the AF controller 61, and the like and a second housing 68 which houses the AF unit 31. The first housing 67 and the second housing 68 are combined with each other to constitute one housing. Specifically, as shown in FIG. 6, the second housing 68 is combined with the first housing 67 so as to close an opening portion formed at the first housing 67 (so as to fit in the concave-shaped opening portion). In the present embodiment, although the housing is divided, the motors 45, 50, and 55, the main controller 60, the AF controller 61, and the like, and the AF unit 31 are embedded in the drive unit 500.

If an end surface of the opening portion of the first housing 67 is regarded as an outer surface of the drive unit 500, the second housing 68 is a housing different from the housing of the drive unit 500, which is disposed along the outer surface of the housing of the drive unit 500 (or has a shape along the outer surface).

An end portion of the second housing 68 contacts the barrel 100 so that there is not gap between all the circumferences and the outer circumferential surface of the barrel 100, and the inside and the outside of the second housing 68 are spatially shielded. Accordingly, as compared with Embodiment 1, the effect of preventing the intrusion of foreign substances into the second housing 68 (the adherence of foreign substances to the AF sensor 40) can be improved. Similarly to the case of Embodiment 2, a dustproof member may be disposed between the end portion of the second housing 68 and the outer circumferential surface of the barrel 100.

The second housing 68 is provided with the electric connector 66 for inputting an image signal from the amplifier circuit 41 of the AF unit 31 to the AF controller 61.

In Embodiment 3 described above, the case where the second housing 65 which houses the AF unit 31 is disposed in the concave portion formed at a rear portion of the first housing 64 is shown, but in the present embodiment, the second housing 68 is disposed under the first housing 67. As shown in FIG. 6, due to such an arrangement of the second housing 68, an emission direction of a light beam from an AF optical system 42 is an obliquely downward direction, and therefore the second housing 68 is greatly protruded from the first housing 67 to the downward direction if the light beam is guided to the AF sensor 40 in the second housing 68.

Therefore, in the present embodiment, a reflecting mirror 70 which reflects the light beam from the AF optical system 42 to guide it to the AF sensor 40 is provided to convert the emission direction of the light beam from the AF optical system 42 to a horizontal direction by using the reflecting mirror 70. Thus, the great protrusion of the second housing 68 from the first housing 67 to the downward direction is prevented and the growth in size of the whole drive unit 500 is prevented.

In the present embodiment, similarly to Embodiment 3, the AF unit 31 (the second housing 68) is integrated with the drive unit 500, and therefore the possibility of deterioration of the operability of manual focusing or manual zooming caused by providing the AF unit 31 can be reduced.

Each of the first housing 67 (and the motors 45, 50, and 55, the controllers 60 and 61, or the like) and the second housing 68 (and the AF unit 31) is independently detachable from the barrel 100 by forming the housings separately like the present embodiment. Accordingly, as also described in Embodiment 3, at the time of assembling the lens apparatus, a positioning accuracy of the AF unit 31 with respect to the barrel 100 can be easily improved. Further, the maintenance workability for each housing can be improved.

Embodiment 5

Figure 7:
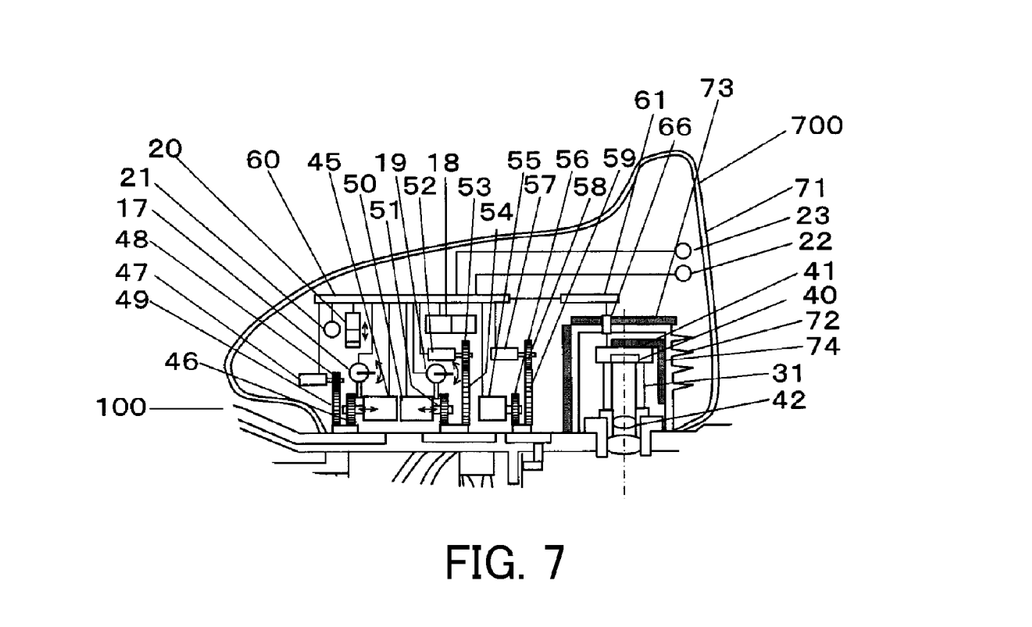
FIG. 7 is a schematic diagram showing an internal structure of a drive unit included in a lens apparatus that is Embodiment 5 of the present invention.

FIG. 7 shows an internal structure of a drive unit included in a lens apparatus that is Embodiment 5 of the present invention. In FIG. 7, elements common to those shown in FIG. 1 are denoted by the same reference numerals of FIG. 1 and description thereof will be omitted.

In the present embodiment, a housing (hereinafter, referred to as a second housing) 72 which houses the AF unit 31 is disposed inside a housing (hereinafter, referred to as a first housing) of a drive unit 700. The second housing 72 is provided with the electric connector 66 for inputting an image signal from the amplifier circuit 41 of the AF unit 31 to the AF controller 61.

An electromagnetic shield member 73 is attached to an outer surface of the second housing 72, i.e. between the motors 45, 50, and 55, and the AF unit 31. The electromagnetic shield member 73 prevents the intrusion of a radiation noise generated by the motors 45, 50, and 55 into the housing 72. It is also effective to prevent the intrusion of the radiation noise generated around the lens apparatus into the housing 72. Thus, the possibility of causing an error operation of the AF due to the influence of the radiation noise for the AF sensor 40 or the amplifier circuit 41 disposed inside the housing 72 to disturb its output or the amplification of the noise component can be reduced.

Each of end portions of the first and second housings 71 and 72 contacts the barrel 100 so that there is not gap between all the circumferences and the outer circumferential surface of the barrel 100, and the inside and the outside of each housing are spatially shielded. Accordingly, as compared with Embodiment 1, especially the effect of preventing the intrusion of foreign substances into the second housing 72 (the adherence of foreign substances to the AF sensor 40) can be improved.

Further, the second housing 72 is provided with a portion having a cooling fin shape, and a heat transfer member 74 which is thermally connected with the amplifier circuit 41 contacts an inner surface of the portion. Thus, the AF sensor 40 or the amplifier circuit 41 which are provided inside the double housings 71 and 72 is efficiently cooled, and the overheat of them can be prevented.

Because the AF unit 31 is also embedded in the drive unit 700 of the present embodiment, the possibility of deterioration of operability of manual focusing or manual zooming can be reduced.

Embodiment 6

Figure 8:
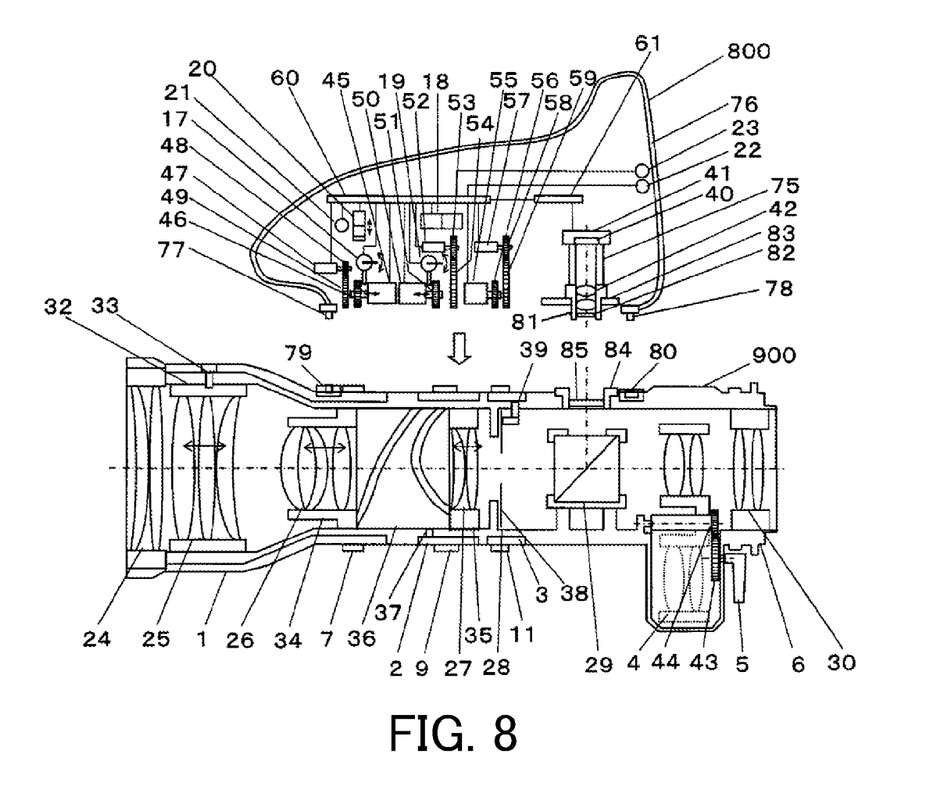
FIG. 8 is a schematic diagram showing an internal structure of a lens apparatus that is Embodiment 6 of the present invention.

FIG. 8 shows an internal structure of a drive unit included in the lens apparatus that is Embodiment 6 of the present embodiment. In FIG. 8, elements common to those shown in FIG. 1 are denoted by the same reference numerals of FIG. 1 and description thereof will be omitted.

In the present embodiment, a drive unit 800 including an AF unit 75 is detachable with respect to a barrel 900 by a user. The drive unit 800 is provided with a mechanism for performing a positioning with respect to the barrel 900 when it is mounted on the barrel 900.

Specifically, positioning pins 77 and 78 which are inserted into positioning portions 79 and 80 formed at two regions of front and rear regions of the barrel 900 are provided at an end portion at a side of the barrel 900 on the housing 76 of the drive unit 800.

Figure 9:
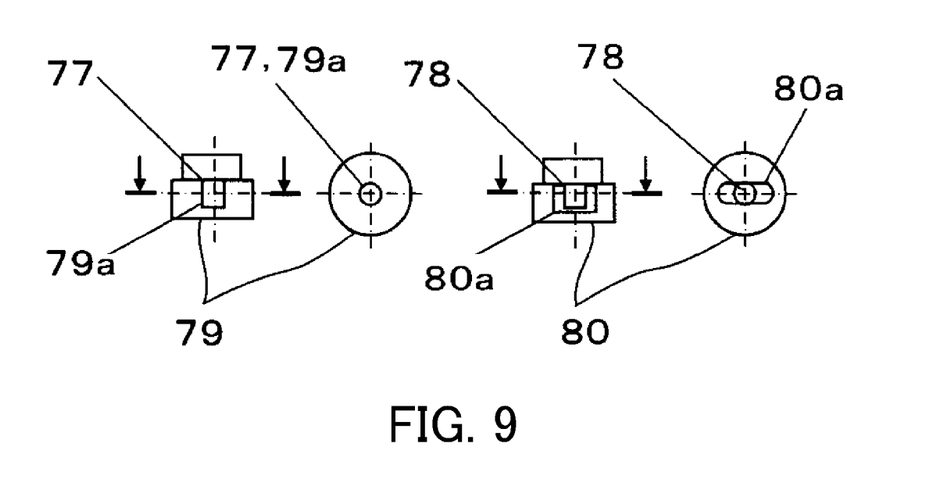
FIG. 9 is an enlarged diagram of a part of FIG. 8.

As shown in FIG. 9, a positioning hole 79a having an internal diameter which fits an external diameter of the positioning pin 77 is formed at the positioning portion 79. On the other hand, a positioning elongate hole 80a having an internal diameter longer than an external diameter of the positioning pin 78 in an optical axis direction is formed at the positioning portion 80. The positioning pins 77 and 78 are inserted into the positioning holes 79a and 80a to be able to perform a positioning of the drive unit 800 with respect to the barrel 900 in the optical axis direction and a barrel circumferential direction.

An AF unit 75 is fixed on the housing 76 via a mounting board 83. The AF unit 75 has a protective filter 82 which covers an incident surface of the AF optical system 42 as well as the AF sensor 40, the amplifier circuit 41, and the AF optical system 42.

The protective filter 82 prevents the adherence of dirt or dust onto the incident surface of the AF optical system 42 when the drive unit 800 is removed from the barrel 900.

On the other hand, a barrel receiving member 84 in which an AF barrel 81 holding the AF optical system 42 and the protective filter 82 is inserted is attached to an outer circumferential wall of the barrel 900. A protective filter 85 for preventing the intrusion of foreign substances such as dirt or dust into the barrel 900 is disposed inside the barrel receiving member 84.

An external diameter of the AF barrel 81 and an internal diameter of the barrel receiving member 84 are designed so that these are loosely fitted as compared with the fit between the positioning pin 77 and the positioning hole 79a. Thus, when a position of the drive unit 800 with respect to the barrel 900 is determined by the positioning pins 77 and 78 and the positioning portions 79 and 80, the AF barrel 81 is naturally inserted in the barrel receiving portion 84.

According to the present embodiment, the positioning mechanism as described above is capable of improving the position reproducibility of the AF unit 75 with respect to the barrel 900 when the drive unit 800 containing the AF unit 75 is mounted on the barrel 900. Further, the protective filters 82 and 85 are provided at the AF unit 75 and the barrel 900 to be able to prevent the intrusion of foreign substances into the AF unit 75 and the barrel 900 when the drive unit 800 and the barrel 900 are divided. As described in the present embodiment, the drive unit 800 is detachable from the barrel 900 to improve the maintenance workability of the drive unit 800.

As above, in the present invention, the focus detector disposed outside the barrel is embedded in the drive unit or is housed in another housing disposed along the outer surface of the drive unit. Thus, according to the present invention, deterioration of the operability of the operating member caused by disposing the focus detector outside the barrel can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

A lens unit including a focus detector outside a barrel and capable of preventing deterioration of manual operability and a camera system including the lens apparatus can be provided.

This application claims the benefit of Japanese Patent Application No. 2009-048702, filed on Mar. 3, 2009, which is hereby incorporated by reference herein in its entirety.

What is claimed is:
1. A lens apparatus comprising:
   a barrel which houses an imaging optical system including a magnification-varying lens unit, a focus lens unit, and a beam separation element which separates a part of a light beam from an object out of a light beam directed to an imaging surface;
   an operating member disposed on an outer circumference of the barrel and configured to be manually operated;
   a drive unit disposed outside the barrel and including an actuator which drives each of the magnification-varying lens unit and the focus lens unit, and a controller which controls the actuator; and a focus detector disposed outside the barrel and configured to detect a focus state of the imaging optical system using the light beam separated by the beam separation element, wherein the focus detector is embedded in the drive unit.

2. A lens apparatus comprising:

a barrel which houses an imaging optical system including a magnification-varying lens unit, a focus lens unit, and a beam separation element which separates a part of a light beam from an object out of a light beam directed to an imaging surface;

an operating member disposed on an outer circumference of the barrel and configured to be manually operated;

a drive unit disposed outside the barrel and including an actuator which drives each of the magnification-varying lens unit and the focus lens unit, and a controller which controls the actuator; and a focus detector disposed outside the barrel and configured to detect a focus state of the imaging optical system using the light beam separated by the beam separation element, wherein the focus detector is housed in a housing different from that of the drive unit which is disposed along an outer surface of the drive unit.

3. A lens apparatus according to claim 2, wherein at least one of the housings of the focus detector and the drive unit is provided with an electric connector for inputting a signal from the focus detector to the controller.

4. A lens apparatus according to claim 2, wherein an electromagnetic shield member is disposed between the actuator and the focus detector.

5. A camera system comprising:

a lens apparatus; and a camera on which the lens apparatus is detachably mounted and configured to perform a photoelectric conversion of an optical image of an object to generate a shooting image, wherein the lens apparatus comprises:

a barrel which houses an imaging optical system including a magnification-varying lens unit, a focus lens unit, and a beam separation element which separates apart of a light beam from an object out of a light beam directed to an imaging surface;

an operating member disposed on an outer circumference of the barrel and configured to be manually operated;

a drive unit disposed outside the barrel and including an actuator which drives each of the magnification-varying lens unit and the focus lens unit, and a controller which controls the actuator; and a focus detector disposed outside the barrel and configured to detect a focus state of the imaging optical system using the light beam separated by the beam separation element, and wherein the focus detector is embedded in the drive unit.

6. A camera system comprising:

a lens apparatus; and a camera on which the lens apparatus is detachably mounted and configured to perform a photoelectric conversion of an optical image of an object to generate a shooting image, wherein the lens apparatus comprises:

a barrel which houses an imaging optical system including a magnification-varying lens unit, a focus lens unit, and a beam separation element which separates a part of a light beam from an object out of a light beam directed to an imaging surface;

an operating member disposed on an outer circumference of the barrel and configured to be manually operated;

a drive unit disposed outside the barrel and including an actuator which drives each of the magnification-varying lens unit and the focus lens unit, and a controller which controls the actuator; and a focus detector disposed outside the barrel and configured to detect a focus state of the imaging optical system using the light beam separated by the beam separation element, and wherein the focus detector is housed in a housing different from that of the drive unit which is disposed along an outer surface of the drive unit.

* * * * *